United States Patent [19]
Nara

[11] Patent Number: 5,936,998
[45] Date of Patent: Aug. 10, 1999

[54] SPREAD SPECTRUM MODULATOR

[76] Inventor: Yoshikazu Nara, 127 Wedgewood Cir., Eatontown, N.J. 07724

[21] Appl. No.: 08/648,813

[22] Filed: May 16, 1996

[51] Int. Cl.$^6$ .............................. H04B 1/69; H04L 27/30
[52] U.S. Cl. ...................... 375/200; 375/208; 364/725.01
[58] Field of Search ..................................... 375/200, 202, 375/206, 208; 370/210; 364/725.01, 725.03, 725.02

[56] References Cited

U.S. PATENT DOCUMENTS

| | | | |
|---|---|---|---|
| 4,361,890 | 11/1982 | Green, Jr. et al. .................... | 375/200 |
| 4,559,633 | 12/1985 | Kan et al. ........................... | 375/206 X |
| 5,099,495 | 3/1992 | Mikoshiba et al. ................. | 375/208 X |
| 5,136,614 | 8/1992 | Kiramatsu et al. .................. | 375/200 |
| 5,459,758 | 10/1995 | Moore, III ........................... | 375/200 |
| 5,671,247 | 9/1997 | Souissi et al. ....................... | 375/200 |

Primary Examiner—Young T. Tse
Attorney, Agent, or Firm—Amster. Rothstein & Ebenstein

[57] ABSTRACT

A system and method is disclosed for producing a band-limited modulated information signal. A modulating signal generator is disclosed which provides a band-limited modulating signal having a predetermined bandwidth and cutoff characteristic. A modulator system and method is disclosed for producing a band-limited modulated information signal by combining an information signal with the band-limited modulating signal. A modulating signal generator and method is disclosed which generates a band-limited modulating signal as a series of modulating signal values at periodic intervals. A further modulating signal generator is disclosed which provides a band-limited modulating signal by generating frequencies and combining them at appropriate amplitudes and phases to synthesize a band-limited modulating signal. A further modulating signal generator is disclosed for generating a band-limited modulating signal by generating a time domain signal having a predetermined frequency spectrum and sequentially outputting a digital representation of that time domain signal.

16 Claims, 4 Drawing Sheets

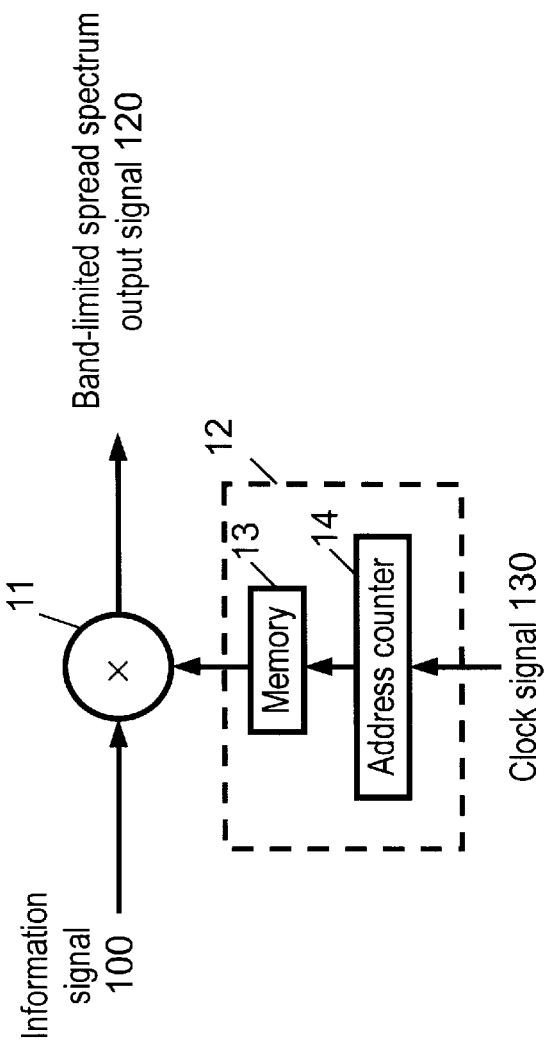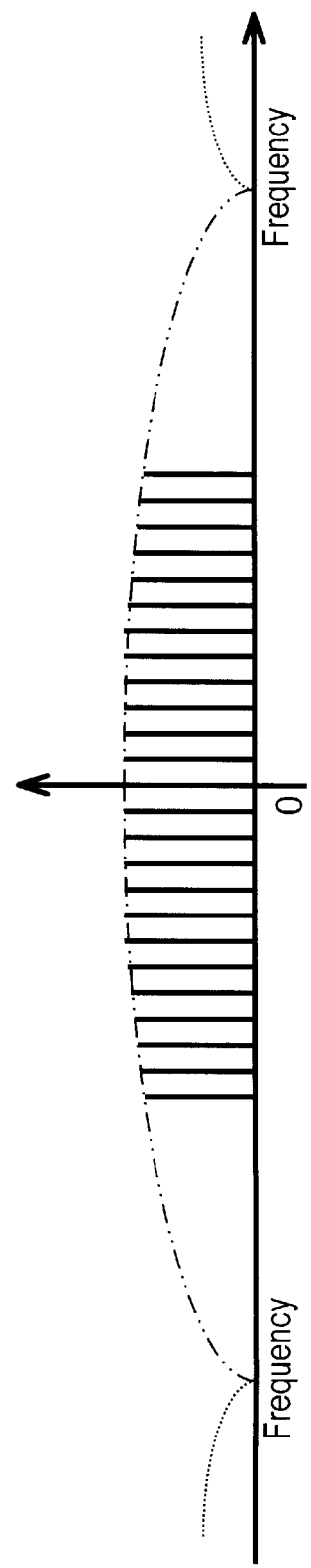

SPREAD SPECTRUM MODULATOR

The present invention relates to a spread spectrum modulator for use in a spread spectrum transmitter, and more specifically, to a spread spectrum modulator for producing a band-limited output without requiring a bandpass filter.

BACKGROUND OF THE INVENTION

An example of the construction of a prior art spread spectrum modulator is shown in FIG. 1(a). This prior art spread spectrum modulator includes a spreading signal generator 33 which supplies a spreading signal to a multiplier 31. The multiplier receives the spreading signal and an information signal 100 and combines them to form a modulated output. A bandpass filter 32 receives the modulated output of the multiplier and has the function of limiting the signal bandwidth prior to transmission of spreading modulation signal 110 so as to reduce, as much as possible, interference coupled onto an adjacent frequency channel which might be used by other transmitters or communication systems.

The operations of the above-described spread spectrum modulator will now be described. An information signal 100 having a limited bandwidth such as shown in FIG. 1(b) is received at the input to the multiplier 31 of the spread spectrum modulator. Spreading signal generator 33 generates a periodic spreading signal which has a very broad frequency spectrum such as shown in FIG. 1(c). As illustrated in FIG. 1(c), the frequency spectrum of the spreading signal can be expressed as the sum of discrete line spectra, which correspond to sine wave signals in the time domain. As a result of multiplying the information signal 100 by the spreading signal a modulated output signal is produced which has a very broad frequency spectrum as illustrated in FIG. 1(d). The modulated output is input to the bandpass filter 32 which then limits its bandwidth, so as to output a modulated signal having a frequency spectrum as illustrated in 1(e).

FIG. 2 illustrates an example of the construction of a prior art transmitter containing a prior art spread spectrum modulator of the type as illustrated in FIG. 1. The prior art transmitter incorporates a microphone 41 for transducing a voice signal 200 into an analog electrical signal, a coder 42 for converting the analog signal into a digital information signal, and a spread spectrum modulator 43 of the type as illustrated in FIG. 1 coupled to receive the digital information signal. The digital information signal is received at the input to the multiplier 48 of the spread spectrum modulator 43. Spreading signal generator 50 generates a periodic spreading signal which is also input to multiplier 48. The modulated output of multiplier 48 is input to the bandpass filter 49. A frequency converter 44 and an additional bandpass filter 45 are coupled to the output of the spread spectrum modulator 43 for respectively converting the modulated signal to transmission frequency and limiting its transmission bandwidth. An amplifier 46 is used to amplify the output of the bandpass filter 45. Antenna 47 is used to transmit the output signal of the amplifier 46 over the airwaves.

The operation of the prior art transmitter will now be described. Microphone 41 transduces a voice signal 200 to an analog electrical signal and inputs it to the coder 42. The coder 42 converts the analog signal into a digital signal, and depending on the case, may be used to digitally process or compress the signal. The coder 42 then outputs the resulting digital signal to spread spectrum modulator 43 for modulation thereof. After modulation, the frequency converter 44 shifts as denoted by Δf, in a manner as illustrated in FIG. 2(b), the baseband output of the spread spectrum modulator 43 to a wireless transmission frequency, which results in a modulated transmission signal having a frequency spectrum such as shown in FIG. 1(e), except for being shifted up to the transmission frequency. While a negatively shifted signal frequency spectrum appears in FIG. 2(b), only the positive portion of the frequency spectrum is transmitted.

The bandpass filter 49 used in spread spectrum modulator 43 generally does not have a sharp cut-off characteristic which would eliminate signal components which lie outside of the assigned transmission frequency bandwidth. Therefore, the prior art transmitter incorporates an additional bandpass filter 45 to eliminate frequency components in the output of frequency converter 44 which lie outside of the assigned transmission band. In this way, the level of interference coupled between signals transmitted on adjacent frequencies can be kept within acceptable limits.

The prior art spread spectrum modulator and transmitter which are illustrated in FIGS. 1 and 2 rely on bandpass filters to minimize the interference coupled onto adjacent signal frequencies. Since the frequency spectrum of the input signal to the bandpass filter 32 has a shape as illustrated in FIG. 1(d), and the frequency spectrum of the output signal must have a shape as shown in FIG. 1(e), the bandpass filters 32 and 45 must have sharp cut-off characteristics.

In order to implement a bandpass filter in hardware which has a sharp cut-off characteristic, the scale of the hardware must be increased. On the other hand, if such bandpass filter is to be implemented in software, the calculation quantity must be increased beyond acceptable limits. As a result, with the prior art transmitter and modulator, a design point must be reached which either results in unsatisfactory coupling of interference onto adjacent channels, or in modulator systems which require expensive, bulky filter hardware and/or additional processing power to appropriately band-limit signals for transmission.

In addition, in prior art spread spectrum transmitters, because the incorporated bandpass filter 32 of the spread spectrum modulator 43 has unsatisfactory cut-off characteristics, an additional bandpass filter 45 must be provided to reduce the interference coupled onto adjacent frequency channels to within acceptable limits.

It is therefore an object of the present invention to provide a spread spectrum modulator which does not require a bandpass filter, while eliminating the interference coupled onto an adjacent signal frequency.

It is a further object of the invention to provide a spread spectrum modulator which permits a reduction in the scale of hardware and/or the calculation quantity of software.

Still another object of the invention is to provide a spread spectrum modulator for incorporation into a spread spectrum transmitter which produces a modulated signal output that is free of interference components that may be coupled onto adjacent signal frequencies, such that the spread spectrum transmitter does not require a bandpass filter.

SUMMARY OF THE INVENTION

In order to solve the above-described problems associated with prior art spread spectrum modulators and transmitters, the present invention provides a spread spectrum modulator having a spreading signal generator which generates a band-limited spreading signal used for modulating the information signal. By modulating with a band-limited spreading signal, a band-limited modulated signal is produced directly, thereby eliminating the need for a subsequent band-limiting stage which would require a bandpass filter having a sharp cut-off characteristic. At the same time, the need for subsequent bandpass filtering of the signal after conversion to transmission frequency is also eliminated.

BRIEF DESCRIPTION OF THE DRAWINGS

FIG. 3(a) is a block and schematic diagram of a spread spectrum modulator constructed in accordance with the present invention.

FIG. 3(b) illustrates a frequency spectrum of a band-limited spread spectrum modulating signal.

DETAILED DESCRIPTION OF THE PREFERRED EMBODIMENTS

Figure 4:
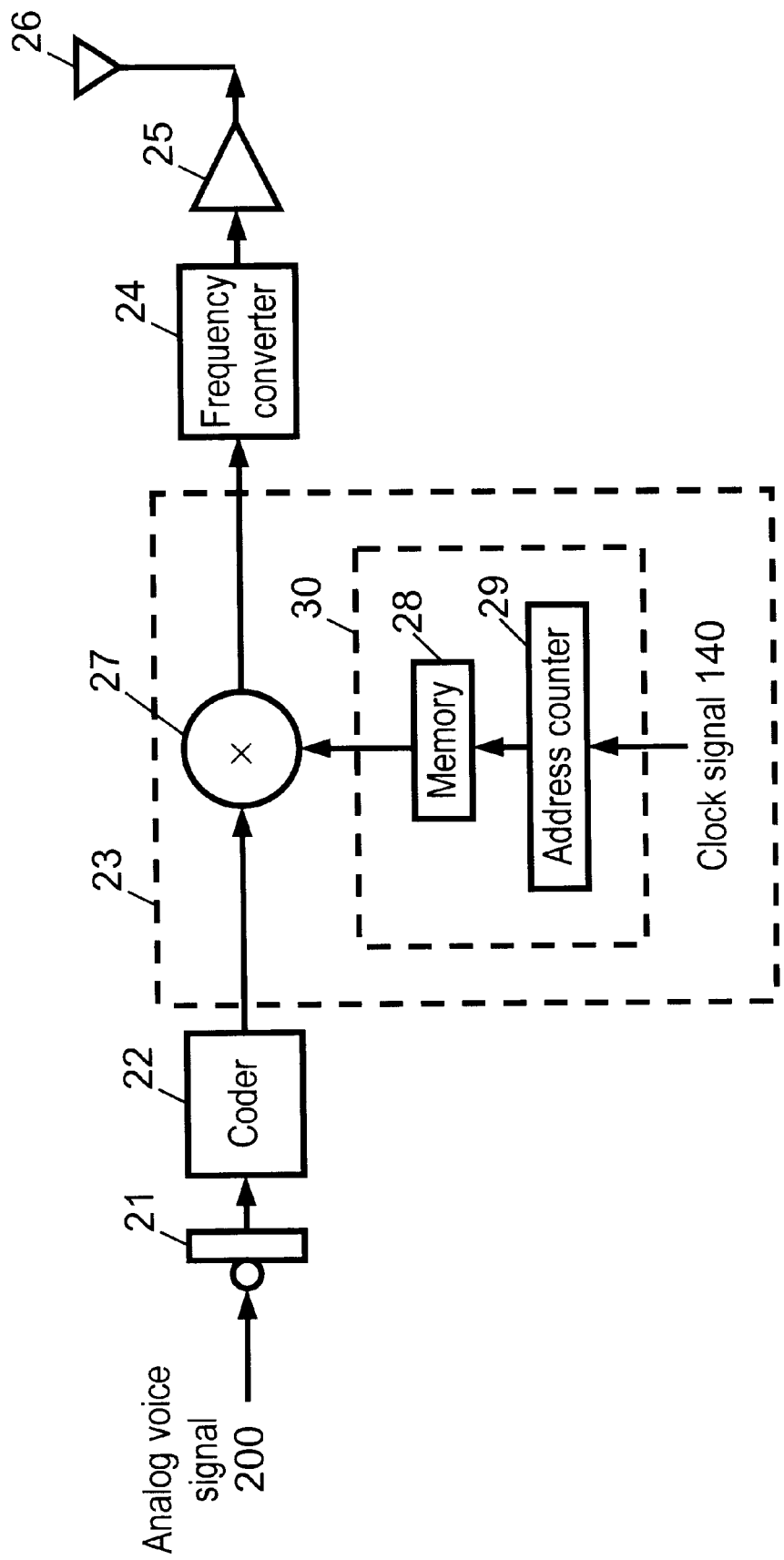
FIG. 4 is a block and schematic diagram of a spread spectrum transmitter constructed in accordance with the present invention.

An embodiment of a spread spectrum modulator constructed in accordance with the present invention will now be described, with reference to FIGS. 3 and 4. FIG. 3(a) illustrates the interconnection of elements of the spread spectrum modulator according to the present invention. The spread spectrum modulator incorporates a spread spectrum modulating signal generator 12 for providing a band-limited spread spectrum modulating signal to a multiplier 11. The multiplier 11 is used to combine the band-limited modulating signal and an information signal 100 to produce a band-limited spread spectrum output signal 120 which requires no further bandpass filtering prior to transmission. The band-limited spread spectrum output signal 120 is encoded according to a spread code and may be demodulated in a receiver using the same spread code as the spread code used in the modulation process.

Spreading signal generator 12 incorporates a memory 13 and an address counter 14. The address counter 14 is used to provide an address designation signal to sequentially retrieve stored modulating signal values from memory 13 which represent the band-limited spread spectrum modulating signal. The spreading signal generator 12 sequentially outputs the stored modulating signal values at periodic intervals in accordance with the address designation signal.

The address counter 14 provides an address designation signal according to the following. A clock signal 130 is provided to the address counter 14 from a clock input. The address counter 14 maintains a count which is proportionally related to the number of clock cycles which have passed. The address designation signal is based on the count so obtained. The address counter 14 continues to increment the count in proportional relation to the clock signal 130 until the address counter 14 has cycled through all the stored modulating signal values in the memory 13. At that time, the address counter 14 then resets the count and begins retrieving the stored modulating signal values from the beginning again. This process is repeated again during each subsequent cycle of the spread spectrum modulating signal.

The band-limited spread spectrum modulating signal is prepared according to the following principles. As described above in relation to the prior art spread spectrum modulator and transmitter, the spread spectrum modulating signal is a periodic signal, such as a periodic spread code signal. As is well known, any periodic signal can be represented as a Fourier series of sine waves at defined amplitudes and phases. Therefore, the frequency spectrum of the periodic spread spectrum modulating signal can be expressed as a sum of line spectra (sine wave signals), as shown in FIG. 1(c).

Figure 1A:
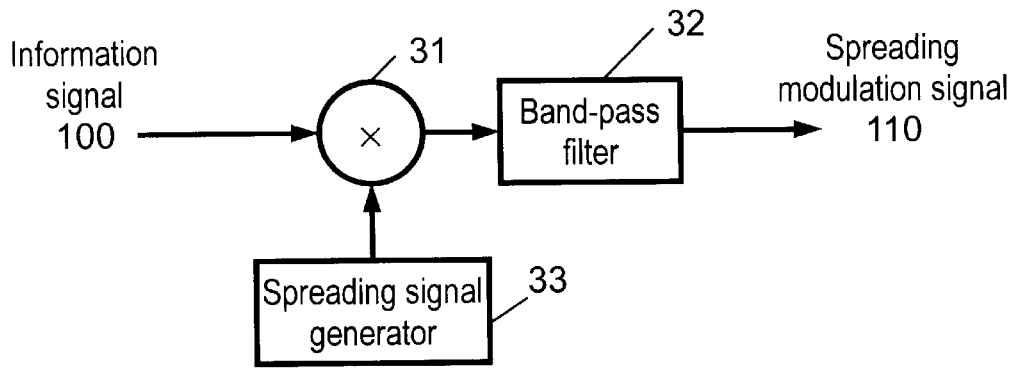
FIG. 1(a) shows a block and schematic diagram of a prior art spread spectrum modulator.
Figure 1B:
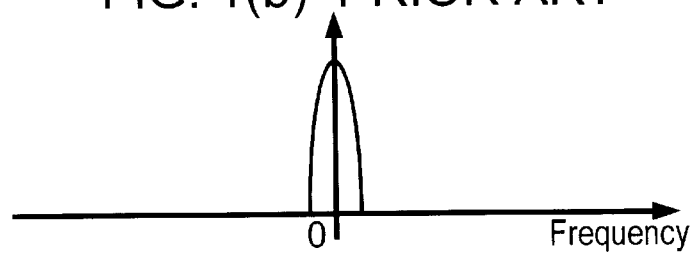
FIG. 1(b) illustrates a frequency spectrum of an information signal before modulation.
Figure 1C:
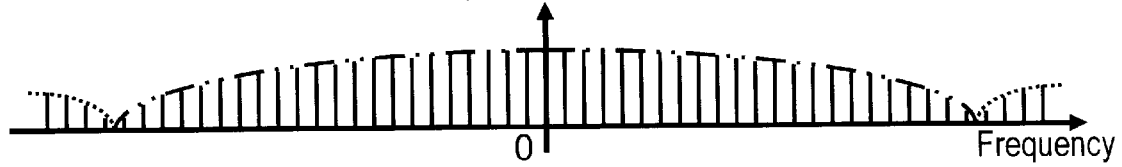
FIG. 1(c) illustrates a frequency spectrum of a spread spectrum modulating signal used to modulate an information signal.
Figure 1D:
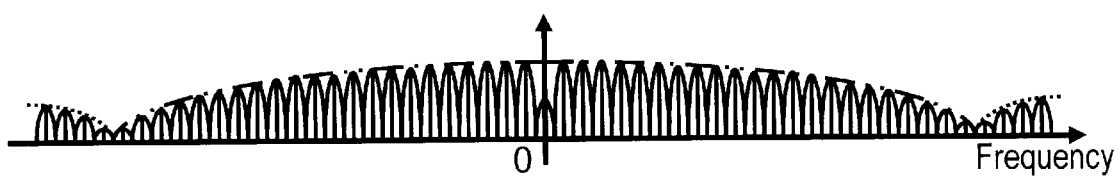
FIG. 1(d) shows a frequency spectrum of a spread spectrum modulated signal prior to subsequent band-limiting.
Figure 1E:
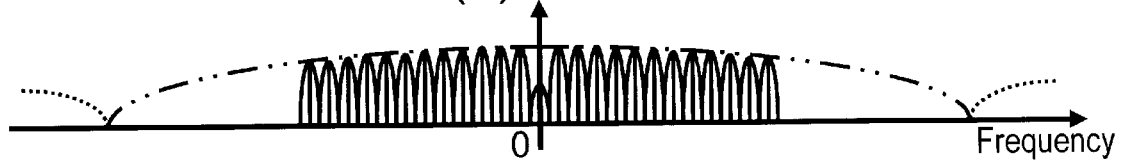
FIG. 1(e) shows a frequency spectrum of a spread spectrum modulated signal after band-limiting.
Figure 2A:
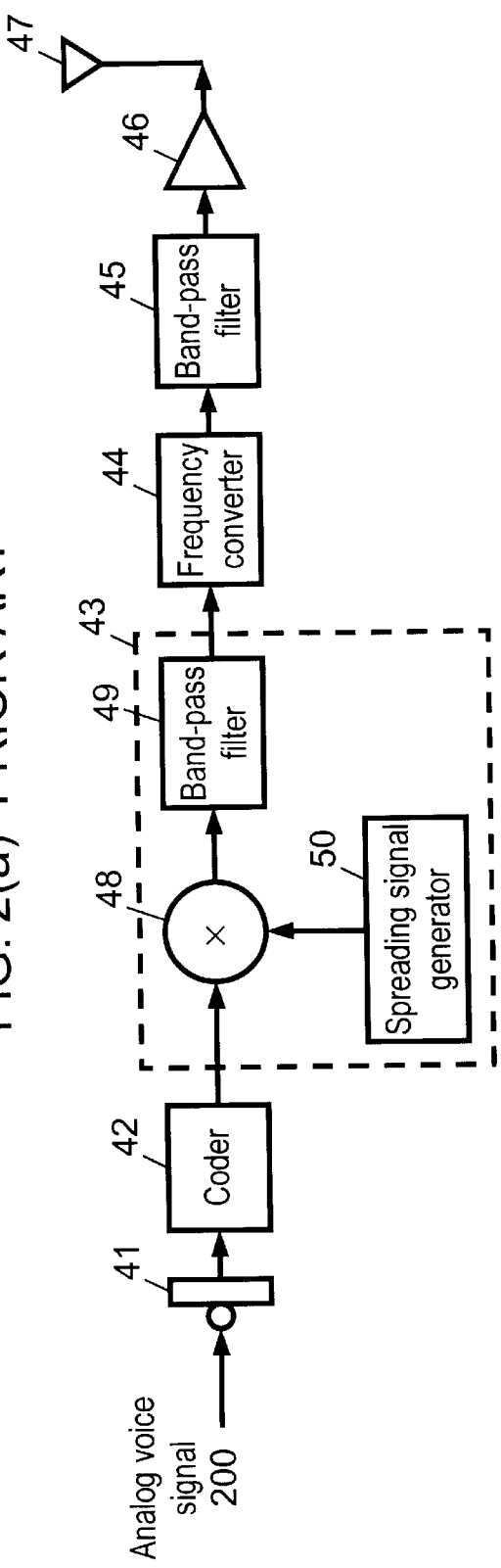
FIG. 2(a) shows a block and schematic diagram of a prior art spread spectrum transmitter.
Figure 2B:
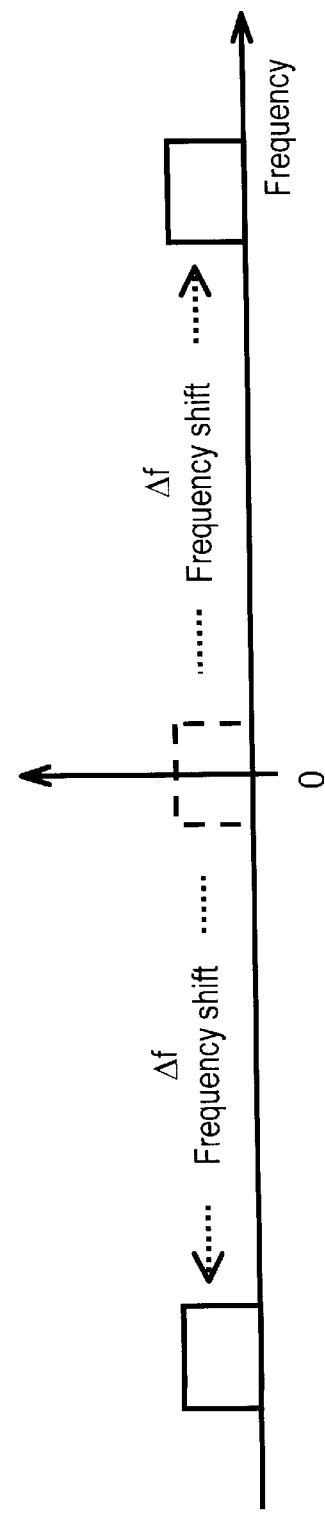
FIG. 2(b) illustrates a shift in the frequency spectrum performed by a frequency converter from baseband to a wireless transmission frequency band.

By the principles described in the foregoing, the broadband spread spectrum modulating signal which is output from the prior art spreading signal generator 33 can be synthesized by generating a series of sine waves which have the same frequencies as those observed in the frequency spectrum (FIG. 1(c)) of the broadband spread spectrum modulating signal and combining those sine waves at the appropriate amplitudes and phases to synthesize the modulating signal.

In a similar manner, a band-limited spread spectrum modulating signal having a frequency spectrum characterized by a predetermined bandwidth and cutoff characteristic can be synthesized by generating a series of sine waves which have the same frequencies as those observed in the band-limited frequency spectrum (FIG. 3(b)) of the band-limited modulating signal and then combining those sine waves at the appropriate amplitudes and phases.

Therefore, the modulating signal values which are used in the spread spectrum modulator of the present invention for combining with the information signal are prepared according to an embodiment of the invention by synthesizing the band-limited frequency spectrum thereof, having predetermined bandwidth and cutoff characteristic, and then digitally converting and storing modulating signal values of the resultant band-limited modulating signal in the memory 13.

In this embodiment of the present invention, the band-limited spreading signal generator 12 of the spread spectrum modulator is constructed with a memory 13 and an address counter 14 which provides an address designation signal based on a clock signal count for addressing the memory. However, the skilled person in the art will recognize how to construct and operate a band-limited spreading signal generator for incorporation into the spread spectrum modulator of the present invention which synthesizes and outputs a band-limited spreading signal in real-time according to the principles described above.

An alternative way of realizing a band-limited spread spectrum modulating signal, which is appropriate for both stored and real-time generating methods is performed through mathematical manipulations of the frequency spectrum of a broadband modulating signal. As described above, it is well known that every periodic time-domain signal can be represented as a series of sine waves at defined amplitudes and phases. Such a sine wave series signal representation is also referred to as a spectral representation. The spectral representation of a signal can be manipulated through mathematical calculations performed by microcode, software or by hardware.

Thus, a band-limited modulating signal having a band-limited frequency spectrum characterized by a predetermined bandwidth and cutoff characteristic may be realized according to a mathematical calculation method by: first determining the frequency spectrum of a broadband modulating signal (e.g., the frequency spectrum such as shown in FIG. 1(c)); truncating that broadband frequency spectrum to obtain the band-limited frequency spectrum of the band-limited modulating signal (e.g., such as the frequency spectrum shown in FIG. 3(b)); and then transforming the band-limited frequency spectrum by further calculations into a periodic time-domain modulating signal having the predetermined bandwidth and cutoff characteristic.

After being generated, the band-limited modulating signal may then be combined in a multiplier 11 with an information signal so as to modulate that information signal, as is the case in a real-time embodiment of the invention. Alternatively, the band-limited modulating signal may be converted into a digital representation for storage in a memory 13 and combining with an information signal at periodic intervals, as described in the foregoing.

In the following, an embodiment of a spread spectrum transmitter constructed in accordance with the present invention will be described, with reference to FIG. 4. As shown, the construction of the spread spectrum transmitter according to the present invention differs from the prior art spread spectrum transmitter by having a band-limited spread spectrum modulator 23 and not incorporating an additional bandpass filter 45 at the output of the frequency converter 24. The transmitter incorporates a microphone 21 for transducing a voice signal 200 into an analog electrical signal, a coder 22 for converting the analog signal into a digital information signal, and a spread spectrum modulator 23 of the type illustrated in FIG. 3 for receiving the digital information signal. A frequency converter 24 and an amplifier 25 are coupled to the output of the spread spectrum modulator 23. Antenna 26 is used to transmit the output signal of the amplifier 25. The spread spectrum modulator 23 incorporates a spread spectrum modulating signal generator 30 for providing a band-limited spread spectrum modulating signal to multiplier 27. Spreading signal generator 30 incorporates a memory 28 and address counter 29. A clock signal 140 is provided to the address counter 29.

The operations of the spread spectrum transmitter according to the present invention will now be described. Since the frequency spectrum of the spread spectrum modulating signal output of the spreading signal generator 30 is limited to the assigned bandwidth, the modulated signal output of the multiplier 27 contains no interference components to be coupled onto an adjacent frequency channel. Therefore, even after conversion of the modulated signal to transmission frequency by the frequency converter 24, the frequency converted signal contains no interference components outside of the assigned transmission band. In this manner, the need for an additional bandpass filter 45 after the frequency converter 24 is eliminated. Thus, the spread spectrum transmitter according to the present invention is used to transmit band-limited modulated signals without requiring costly bandpass filter hardware or an excessive software calculation quantity.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A modulator for modulating an information signal to produce a band-limited modulated information signal, comprising:

generating means for generating a band-limited modulating signal having a predetermined bandwidth and cutoff characteristic corresponding to a preassigned transmission bandwidth and desired cutoff characteristic; and means for combining said information signal with said band-limited modulating signal to produce said band-limited modulated information signal.

2. The modulator of claim 1 wherein said generating means includes:

means for generating frequencies needed to synthesize said band-limited modulating signal; and means for combining said generated frequencies at appropriate amplitudes and phases to synthesize said band-limited modulating signal.

3. The modulator of claim 1 wherein said generating means provides a series of modulating signal values at periodic intervals representative of said band-limited modulating signal.

4. The modulator of claim 3 wherein said generating means includes:

means for storing said series of modulating signal values; and means for sequentially retrieving, at said periodic intervals, said modulating signal values.

5. The modulator of claim 4 wherein said band-limited modulating signal is a spread code signal for use in producing a spread spectrum modulated information signal.

6. The modulator of claim 1 wherein said band-limited modulating signal is a spread code signal for use in producing a spread spectrum modulated information signal.

7. A modulating signal generator comprising:

generating means for generating frequencies needed to synthesize a band-limited modulating signal having a preassigned transmission bandwidth and a desired cutoff characteristic; and means for combining said generated frequencies at appropriate amplitudes and phases to synthesize said band-limited modulating signal.

8. The modulating signal generator of claim 7 wherein said band-limited modulating signal is a spread code signal for use in producing a spread spectrum modulated information signal.

9. A modulating signal generator for generating a periodic modulating signal comprising:

means for generating a time domain signal having a frequency spectrum characterized by a preassigned transmission bandwidth and desired cutoff characteristic for use in modulating a digital information signal; and means for outputting a digital representation of said time domain signal to generate said periodic modulating signal.

10. The modulating signal generator of claim 9 further including:

means for storing said digital representation of said time domain signal; and means for sequentially retrieving said digital representation.

11. A method for modulating an information signal to produce a band-limited modulated information signal, comprising the steps of:

generating a band-limited modulating signal having a predetermined bandwidth and cutoff characteristic corresponding to a preassigned transmission bandwidth and desired cutoff characteristic; and combining said information signal with said band-limited modulating signal to produce said band-limited modulated information signal.

12. The method of claim 11 wherein said band limited modulating signal is a spread code signal for use in producing a spread spectrum modulated information signal.

13. The method of claim 11 wherein said step of generating includes:

generating frequencies needed to synthesize a frequency spectrum of said band-limited modulating signal having said predetermined bandwidth and cutoff characteristic; and combining said generated frequencies at appropriate amplitudes and phases to synthesize said band-limited modulating signal.

14. The method of claim 11 wherein said step of generating includes:

providing a series of modulating signal values at periodic intervals representative of a modulating signal having said predetermined bandwidth and cutoff characteristic.

15. The method of claim 14 wherein said step of providing includes storing said series of modulating signal values; and sequentially retrieving, at said periodic intervals, said modulating signal values.

16. A method for generating a periodic time-domain modulating signal from a broadband modulating signal for use in modulating a digital information signal, comprising the steps of:

determining the frequency spectrum of said broadband modulating signal;

truncating said frequency spectrum of said broadband modulating signal at frequencies defining a preassigned bandwidth to obtain a band-limited frequency spectrum characterized by said preassigned bandwidth and having a desired cutoff characteristic; and transforming said band-limited frequency spectrum into said periodic time-domain modulating signal.

* * * * *